United States Patent [19]

Shanks

[11] 4,048,358

[45] Sept. 13, 1977

[54] LIQUID CRYSTAL DEVICES

[75] Inventor: Ian Alexander Shanks, Malvern, England

[73] Assignee: The Secretary of State for Defence in Her Britannic Majesty's Government of the United Kingdom of Great Britain and Northern Ireland, London, England

[21] Appl. No.: 715,263

[22] Filed: Aug. 18, 1976

Related U.S. Application Data

[63] Continuation of Ser. No. 636,786, Dec. 1, 1975, abandoned.

[30] Foreign Application Priority Data

Dec. 2, 1974 United Kingdom ............... 52123/74

[51] Int. Cl.$^2$ .............................................. C09K 3/34
[52] U.S. Cl. ................................... 428/1; 23/230 LC; 350/160 LC; 428/304; 428/913
[58] Field of Search ................. 428/1, 9, 13, 304, 426, 428/442, 540; 350/160 LC; 23/230 LC

[56] References Cited

U.S. PATENT DOCUMENTS

| | | | |
|---|---|---|---|
| 3,620,889 | 11/1971 | Baltzer | 428/1 |
| 3,728,008 | 4/1973 | Allan | 428/1 |
| 3,898,354 | 8/1975 | Parker | 428/913 |

*Primary Examiner*—Marion E. McCamish
*Attorney, Agent, or Firm*—Pollock, Vande Sande & Priddy

[57] ABSTRACT

A liquid crystal device includes a sheet of plastic material having an open pore structure in which a liquid crystal material has been introduced. The liquid crystal material may be dichroic and contain one or more dyes which may be dichroic. The liquid crystal material may be nematic or cholesteric or a mixture of these two or a smectic material. Protective layers of plastic or glass may be arranged to enclose the sheet and the protective layer may carry electrodes. The liquid crystal may be applied to selected portions only of the sheet and the remaining parts of the sheet filled with a non-mesomorphic material.

11 Claims, 5 Drawing Figures

LIQUID CRYSTAL DEVICES

This is a continuation of application Ser. No. 636,786, filed Dec. 1, 1975, now abandoned.

This invention relates to liquid crystal devices for use in displays.

Various devices and effects may be produced by using a cell containing one or a mixture of liquid crystal materials known as nematic, smectic, or cholesteric liquid crystal material. Typically a cell is constructed by enclosing a thin e.g. 3 to 100 $\mu$ thick, layer of liquid crystal material between two glass plates carrying transparent electrodes on their inner faces i.e. the faces in contact with the liquid crystal material. Application of an electric voltage across the liquid crystal layer causes a re-orientation of the liquid crystal molecules i.e. an 'on' condition; removal of the voltage allows the molecules to relax back to their original orientation i.e. an 'off' condition. The orientation of the molecules with no voltage applied to the liquid crystal layer may be controlled by suitable surface treatment of the inner faces of the glass plates. For example unidirectional rubbing of the inner faces of the plates will cause the molecules of a nematic material immediately adjacent the plates to align themselves along the rubbing direction.

By using shaped electrodes various shapes, e.g. numerals or letters may be displayed. Also using a number of shaped electrodes alpha-numerical displays can be made. One example of this is a liquid crystal display digital clock.

Dyes may be incorporated into the liquid crystal material whereby various colours may be observed.

Liquid crystal materials have been combined with a carrier as an emulsion and painted in thin layers onto substrates. When dry the encapsulated liquid crystal film may be used in various ways, for example the color change with temperature of the liquid crystal can be used to indicate temperature pattern in the substrate.

According to this invention a liquid crystal device includes a sheet of plastic material having an open elongated pore structure into which pores a liquid crystal material has been introduced.

The liquid crystal material may be painted, printed or sprayed onto one or both faces of a sheet of the plastics material whereupon capillary action will fill the pores with the liquid crystal material. Excess liquid crystal material may then be wiped off.

The liquid crystal material may incorporate one or more dyes such as iodine or a dichroic dye and may be arranged in any desired pattern on the plastic sheet. Parts of the sheet not impregnated with liquid crystal material may be impregnated with a non-mesormorphic organic liquid such as lubricating oil.

The micropore size of the plastics sheet may be a little larger than the molecular dimensions of the liquid crystal up to 100 $\mu$m or more.

Electodes may be arranged in contact with the plastics sheet, to apply an electrical voltage across the liquid crystal whereby the liquid crystal may be caused to exhibit the know effects, e.g. the field effect, and the phase change effect.

Protective layers of lacquer may be applied to both side of the sheet.

A liquid crystal cell may be constructed by using a liquid crystal impregnated plastic sheet arranged between two glass plates both coated on their inside faces with an electode. Such a construction allows a large cell to be made with a constant liquid crystal layer thickness over the whole of the cell.

The invention will now be described by way of example only with reference to the accompanying drawings of which:

Figure 1:
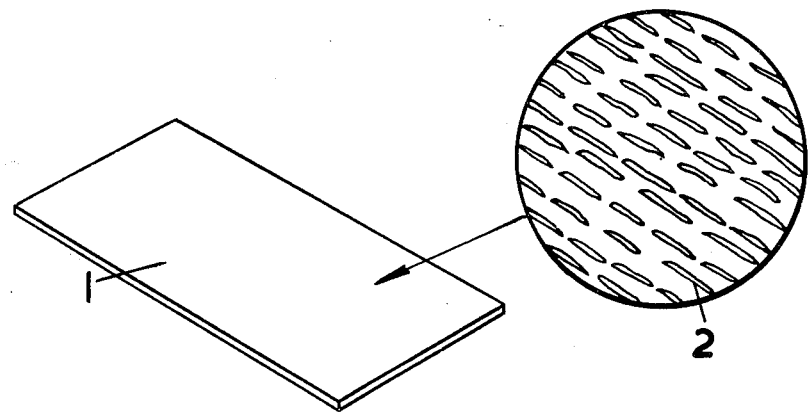
FIG. 1 shows a thin sheet of plastics material.

As shown in FIG. 1 a thin sheet 1, typically 25 $\mu$ thick, of polypropylene sheet e.g. CELGARD 2400, has an open micropore structure 2 of elongated form. These micropores 2 are all aligned and are slightly larger than liquid crystal material molecules. If an amount of liquid crystal is deposited on the sheet 1 it is drawn into the micropores 2 and, because of the micropore alignment, the liquid crystal molecules are all aligned in the sheet. Excess liquid crystal may then be wiped off and the sheet 1 containing the liquid crystal feels dry to the touch.

The liquid crystal material may be deposited on the sheet 1 by a printing technique so that only selected areas of the sheet receive the liquid crystal; other areas may receive a non-mesomorphic organic liquid such as a thin lubricating oil.

The liquid crystal material may be a dichroic material e.g. Merck Phase V or a non-dichroic material incorporating one or more dichroic dyes e.g. Sudan Black or iodine, arranged to provide the required color. The liquid crystal material may be a nematic, cholesteric or a mixture of these two, or a smectic material.

Figure 2:
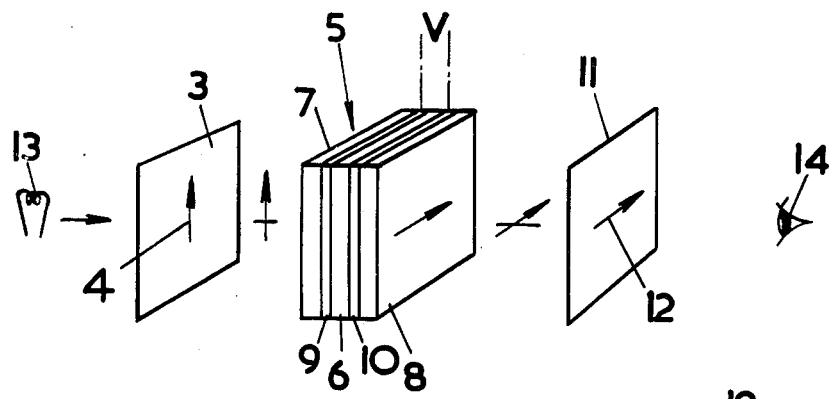
FIG. 2 shows diagrammatically an exploded view of a color change switch.

FIG. 2 shows how a dichroic polarizing sheet constructed as shown in FIG. 1 may be used to display a color change. A dichroic polarizing sheet 3 is arranged with its axis of polarization 4 vertical and normally in contact with a twisted nematic liquid crystal cell 5. This cell 5 comprises a 12 $\mu$m layer of nematic liquid crystal material 6 sandwiched between glass slides 7, 8 coated on their inner face with electrodes 9, 10. Prior to assembly the inner faces are unidirectionally rubbed to provide an alignment of liquid crystal molecules at the surface and on assembly these slides 7, 8 are positioned so the directions of rubbing are orthogonal. Such a cell will rotate plane polarized light by 90° in the absence of a voltage but on the application of a suitable voltage, e.g. 12 volts, across the electrodes 9, 10 the cell 5 loses this ability to rotate the plane of polarization. Adjacent the cell 5 on the opposite side to the polarizer 3 is a second dichroic polarizing sheet 11 or analyzing sheet 11 arranged with its axis of polarization 12 horizontal.

In operation with zero volts applied to the cell 5 white light from a source 13 is vertically polarized by the polarizes 3 and then passes through the cell 5 to emerge as horizontally polorized light to pass through the analyzer 11 and be seen by an observe 14 as white light. On application of a voltage above a threshold the light from the polarizer 3 passes through the cell and emrges as vertically polarized light whichpasses through the dichroic analyzer 11 to be observed as a colored light, the color observed being dependent on the liquid crystal material or dyes in the material.

Figure 3:
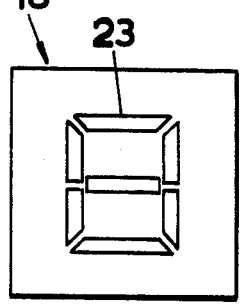
FIG. 3 is a front view of a display.
Figure 4:
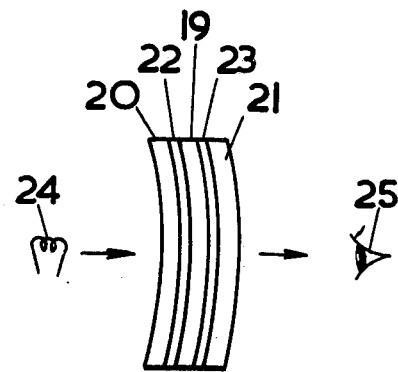
FIG. 4 is a sectional side view of the display shown in FIG. 3.

FIGS. 3, 4 show how the sheet of FIG. 1 may be used in a numeric display. As shown a cell 18 comprises a sheet 19 impregnated with cholesteric (or a nematic cholesteric mixture) liquid crystal material and sandwiched between thin transparent plastic sheets 20, 21 e.g. coated on their inner faces with seven electrodes 22, 23 arranged numeric form as seen in FIG. 3. Since the cell 18 is constructed from thin sheets it can be curved as shown in FIG. 4 or flat as required.

In operation with zero voltage applied to the electrodes 22, 23 the liquid crystal material scatters light, e.g. the material may be a nematic and cholesteric mixture. On application of voltage above a threshold voltage e.g. 20 volts for a 12 $\mu$m thick liquid crystal layer 19 containing about 10% cholesteric in a nematic host, the liquid crystal material becomes optically transparent and light from a source 12 passes through the cell to an observer 25. By application of voltages to appropriate electrodes any number between zero and nine may be displayed.

In an alternative arrangement the sheet 19 may incorporate a nematic liquid crystal and an additional polarizer placed in front of or behind the cell with its axis of polarization orthogonal to that of the sheet's axis of polarization. Application of a suitable voltage to the electrodes will cause the outline of the electrodes to appear in a contrasting color to that of the background color.

In another application of the sheet of FIG. 1 heat is applied to selected parts of a sheet 1 filled with a nematic liquid crystal that is dichroic or contains a dichroic dye. Such heat, if it raises the liquid crystal above its nematic to isotropic point, destroys the birefringence. Thus by using an analyzer the heated parts can be seen.

Figure 5:
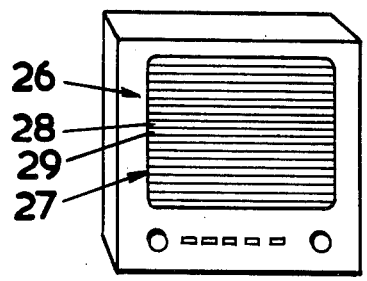
FIG. 5 shows a television with a composite polarizing sheet secured to its face plate.

FIG. 5 shows how a composite polarizing sheet may be used in a three-dimensional display. As previously noted with reference to FIG. 1 a sheet may have the liquid crystal material deposited by a printing process. Thus a series of narrow strips e.g. 125 $\mu$m wide with 125 $\mu$m gaps of liquid crystal material may be arranged on a sheet, the gaps being filled with oil. If two such sheets are arranged orthogonal to one another with the parts containing liquid crystal material out of register, the combined effect is a composite sheet 27 with alternate strips 28, 29 having their axis of polarization horizontal and vertical. A display such as a television display 26 is arranged to show alternate lines representing a left then a right eye view of a scene through a composite polarizer sheet 27. An observer (not shown) wears polarizing spectacles, one lens having its axis of polarization vertical and the other lens having its axis of polaziation horizontal. Each eye will see only information passing through the strips of similar orientation of polarizing axis, and providing the sheet, 27, is registered with the TV raster lines, then three dimensional display may be observed.

I claim:

1. A liquid crystal polarizer device comprising a sheet of plastics material having an open elongated pore structure into which elongated pores a liquid crystal material has been introduced, the size of said pores being slightly larger than the molecular dimensions of said liquid crystal material.

2. A liquid crystal device as claimed in claim 1 wherein the liquid crystal material has been applied to selected portions of the sheet.

3. A liquid crystal device as claimed in claim 2 wherein a non-mesomorphic material has been applied to the sheet in places not carrying liquid crystal material.

4. A liquid crystal device as claimed in claim 1 wherein the sheet is enclosed between protective layers.

5. A liquid crystal device as claimed in claim 4 wherein the protective layers are glass.

6. A liquid crystal device as claimed in claim 4 wherein the protective layers are transparent plastic material.

7. A liquid crystal device as claimed in claim 1 wherein the liquid crystal material is dichroic.

8. A liquid crystal device as claimed in claim 1 wherein the liquid crystal material contains at least one dye.

9. A liquid crystal device as claimed in claim 8 wherein a dye is dichroic.

10. A liquid crystal device as claimed in claim 1 wherein the liquid crystal material is a nematic material.

11. A liquid crystal device as claimed in claim 10 and further including a proportion of cholesteric liquid crystal.

* * * * *